D. W. JONES.
TIRE.
APPLICATION FILED DEC. 8, 1905.

946,638.

Patented Jan. 18, 1910.

Witnesses:
Jas. J. Maloney

Inventor:
David W. Jones
by Attys.

UNITED STATES PATENT OFFICE.

DAVID W. JONES, OF TAUNTON, MASSACHUSETTS.

TIRE.

946,638.  Specification of Letters Patent.  Patented Jan. 18, 1910.

Application filed December 8, 1905. Serial No. 290,881.

*To all whom it may concern:*

Be it known that I, DAVID W. JONES, a citizen of the United States, residing in Taunton, in the county of Bristol and State of Massachusetts, have invented an Improvement in Tires, of which the following description, in connection with the accompanying drawings, is a specification, like letters on the drawings representing like parts.

The present invention relates to a tire, the purpose of the invention being to combine the advantages of a pneumatic tire with those of a solid tire by preserving the greater part of the resiliency afforded by a pneumatic tire, and, at the same time, entirely obviating the liability of punctures.

To these ends, the tire embodying the invention consists in a pneumatic tube which may be of any suitable or usual construction, combined with a tread portion, the major part of which is preferably of some resilient material, such as solid rubber, the said tread portion having a convex inner supporting surface arranged to fit over the pneumatic tube and be held in position by the air pressure when the pneumatic tube is inflated. This convex inner portion is preferably of a material different from that of the tread portion proper, and may conveniently be made of comparatively thin sheet metal to which the tread portion is attached by suitable clamping devices. The convex inner portion may further be provided with transverse projections or ridges which project into the outer surface of the pneumatic tube so as to prevent any longitudinal movement or creeping of the tread portion with relation to the pneumatic portion of the tire. The tread portion may be secured to the metal portion by means of annular clamping members which are held in place by bolts extending transversely through said members and the tread portion, it being practicable to locate the bolts where the transverse projections are formed in the metal part.

Figure 1:
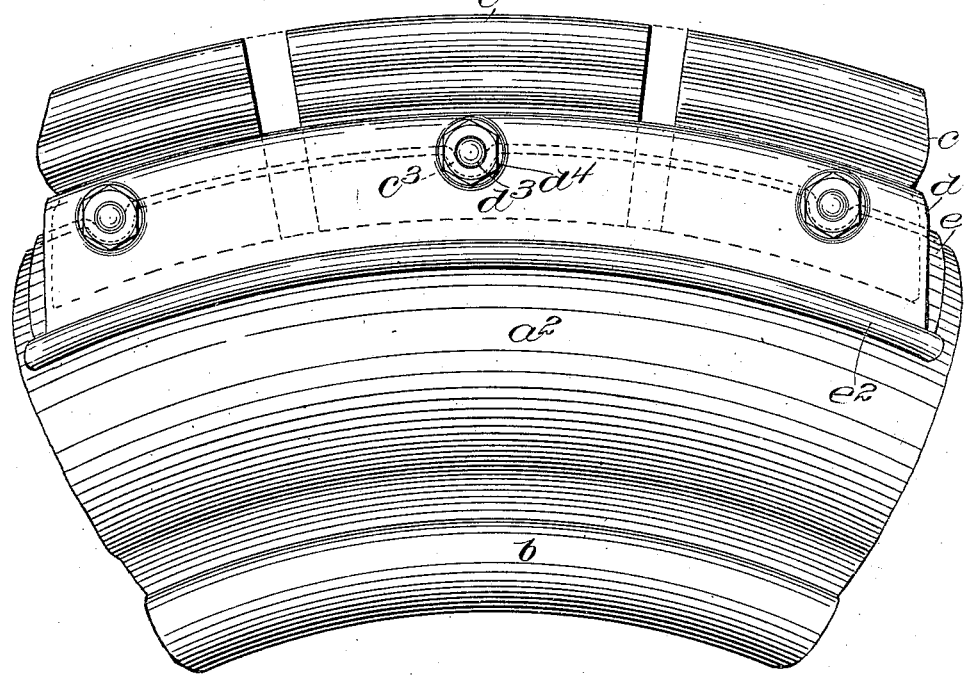
Figure 2:
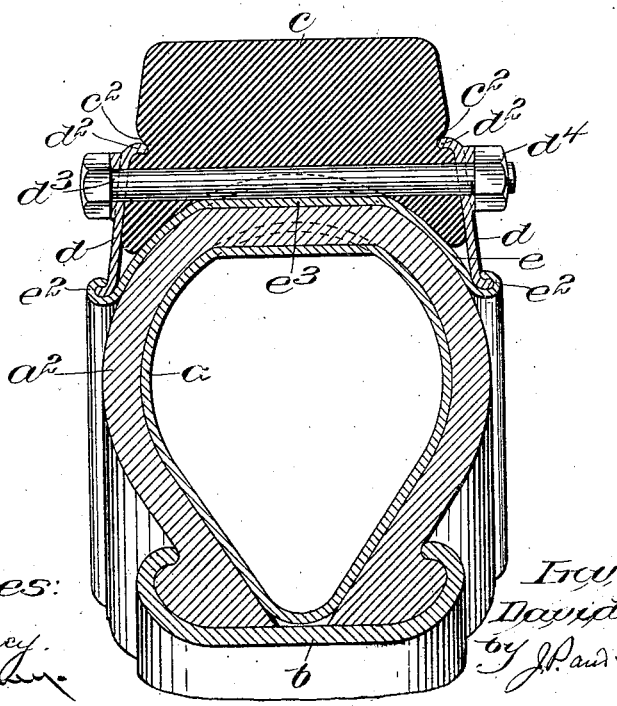

Figure 1 is a side elevation of a portion of a wheel rim equipped with a tire embodying the invention; and Fig. 2 is a transverse section of the same.

The pneumatic portion of the tire which may be of any suitable or usual construction is herein shown as provided for by means of an inner tube $a$ and an outer cover $a^2$, shown as of the well-known clencher type, held in position in the rim $b$ by the air pressure when the tube $a$ is inflated. The tread portion $c$ is herein shown as provided at opposite sides with annular channels $c^2$ to receive lips $d^2$ formed on annular clamping members $d$ at opposite sides of the tire. These clamping members coöperate with a seat $e$ for the tread portion $c$, which seat is herein shown as consisting of sheet metal having a concave inner surface which fits the outer surface of the outer tube $a^2$. The part $e$ is provided with lips or projections $e^2$ to receive the lower edges of the clamping members $d$, the said lips projecting over the said edges so as to hold the said clamping members firmly in position. The clamping members $d$ are held together by means of bolts $d^3$ which extend transversely through the two clamping members at opposite sides, and also through the tread portion $c$, the part $e$ being shown as provided with channels or depressions $e^3$ where the bolts pass through the outer tread portion. These channels or depressions afford seats for the bolts, and, at the same time, constitute inward projections which depress and engage the pneumatic portion of the tire so as to prevent any longitudinal movement of the tread portion with relation to the pneumatic portion. The clamping bolts $d^3$ are provided with nuts $d^4$ by means of which the two clamping members $d$ are drawn firmly into engagement with the tread portion $c$, so as to hold the same snugly in position.

To apply the tread portion to the pneumatic portion, the latter is deflated and flattened, so that the said tread portion can be pushed laterally into place where it is firmly held by the air pressure when the tire has been inflated. The comparatively thick tread portion, combined with the metallic seat, renders it practically impossible to puncture the tire, and the tread portion, if made of suitable material, such as rubber of good quality, affords sufficient resiliency to take care of the minor projections or irregularities in the road surface, while the load is practically supported upon an air cushion, as is the case with the ordinary pneumatic tire.

Generally speaking, the main feature of novelty in the tread portion consists in the concave seat which fits over the pneumatic portion of the tire, it being obvious that the construction of the tread portion may be widely varied without departing from the invention. The said tread portion is herein illustrated as consisting of separate blocks of suitable material, preferably rubber, each block being held in position by means of one of the clamping bolts $d^3$. This construction has the advantage that, in the case of a deep cut or other injury to any part of the tread, the injured block can be removed and another substituted without destroying the entire tread portion. Furthermore, it is not, of course, essential that the tread portion should be of rubber, since other materials might be substituted, the pneumatic portion of the tire being mainly relied upon for the resiliency of the tire as a whole. It is, however, practicable, if desired, to provide the tire with a continuous endless tread portion of solid rubber which can be stretched into place upon the pneumatic portion or the supporting portion, such construction being indicated by the dotted lines in Fig. 1.

It is not intended to limit the invention to the specific construction and arrangement of the tread portion herein shown, or to the specified material or materials composing the said tread portion, since modifications may obviously be made without departing from the invention.

Claim.

In a tire, the combination with a pneumatic tube; of a concave annular member of sheet metal fitting over and conforming to the outer surface of said tube; a tread portion seated on said annular member; transverse channels shaped in said annular member, the under sides of which channels form projections to engage the surface of the pneumatic tube; annular clamping members; and clamping bolts extending through said clamping members and said tread portion, and seated in said transverse channels, substantially as described.

In testimony whereof, I have signed my name to this specification in the presence of two subscribing witnesses.

DAVID W. JONES.

Witnesses:
HARRY W. FAY,
EDWARD G. HALL.